United States Patent [19] [11] 4,199,936
Cowan et al. [45] Apr. 29, 1980

[54] GAS TURBINE ENGINE COMBUSTION NOISE SUPPRESSOR

[75] Inventors: Samuel J. Cowan, Seattle; Robert P. Gerend; James W. Ramsay, both of Bellevue; Belur N. Shivashankara, Renton, all of Wash.

[73] Assignee: The Boeing Company, Seattle, Wash.

[21] Appl. No.: 813,887

[22] Filed: Jul. 8, 1977

Related U.S. Application Data

[63] Continuation of Ser. No. 644,334, Dec. 24, 1975, abandoned.

[51] Int. Cl.² .............................................. F02K 3/00
[52] U.S. Cl. .................................... 60/226 R; 60/725
[58] Field of Search ................ 60/39.65, 39.69, 226 R; 181/222, 256, 258

[56] References Cited

U.S. PATENT DOCUMENTS

| | | | |
|---|---|---|---|
| 2,504,106 | 4/1950 | Berger | 60/39.65 |
| 2,664,702 | 1/1954 | Lloyd et al. | 60/39.65 |
| 2,692,014 | 10/1954 | MacCracken | 60/39.65 |
| 2,704,440 | 3/1955 | Nicholson | 60/39.65 |
| 2,780,060 | 2/1957 | Griffith | 60/39.65 |
| 2,782,597 | 2/1957 | Parsons et al. | 60/39.65 |
| 2,840,989 | 7/1958 | Macaulay | 60/39.65 |
| 3,349,558 | 10/1967 | Smith | 60/39.65 |
| 3,850,261 | 11/1974 | Hehmann et al. | 181/50 |
| 3,948,346 | 4/1976 | Schindler | 181/33 H |

OTHER PUBLICATIONS

Marks, L. S., "Mech. Engineers' Handbook," McGraw-Hill, 1951, pp. 75, 809.

Kazin et al., "Low Frequency Core Engine Noise," ASME Paper 74-WA/Aero-2, Nov. 1974, pp. 1–8.

Primary Examiner—Robert E. Garrett
Attorney, Agent, or Firm—Christensen, O'Connor, Johnson & Kindness

[57] ABSTRACT

A gas turbine engine combustion noise suppressor for a jet engine combustor assembly of the annular, cannular, or canannular variety includes a resonant cavity-type or bulk absorber-type noise suppressor. The inner wall of the combustor assembly is configured to couple combustion noise, generated within the burner cavity formed by the inner combustor wall, into the airflow duct formed between the inner and outer walls of the combustor assembly. The outer wall is perforated to, in turn, couple the combustion noise from the airflow duct into the resonant cavity-type or bulk absorber-type noise suppressor that is mounted on the portion of the outer wall that is adjacent the burner cavity. The inner combustor wall can include a large number of small acoustic openings and/or a smaller number of larger openings that include airflow barriers to couple the combustion noise into the combustor airflow duct while simultaneously minimizing air flow into the burner cavity from the combustor airflow duct. In other embodiments, a short burner cavity is employed that includes flutes or corrugations in the inner combustor wall to effect mixing of air and combustion products normally accomplished within the aft section of a conventional burner cavity. In each embodiment the structural relationship between the combustor and the noise suppressor modifies the combustion process occurring within a conventional combustor to generate less noise than a conventional combustor. The noise suppressor functions to further reduce the noise level.

10 Claims, 5 Drawing Figures

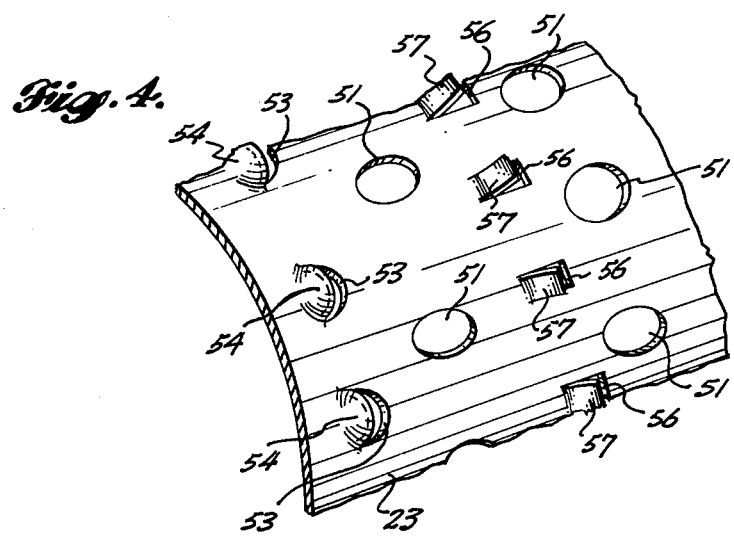
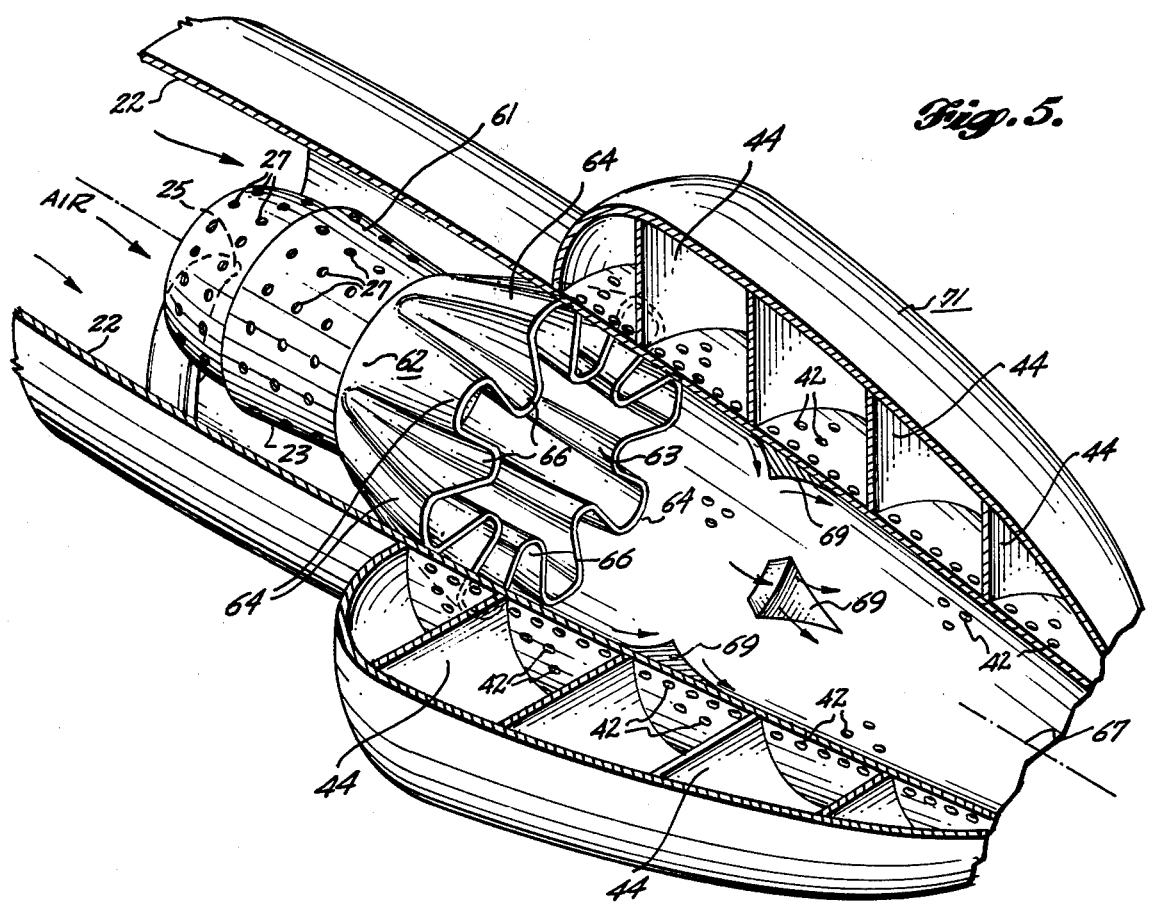

GAS TURBINE ENGINE COMBUSTION NOISE SUPPRESSOR

This is a continuation of application Ser. No. 644,334, filed Dec. 24, 1975, now abandoned.

BACKGROUND OF THE INVENTION

This invention relates to noise suppression apparatus for gas turbine engines. More particularly this invention relates to a combined combustor and noise suppressing assembly for reducing combustion noise in a gas turbine engine.

Recent advances in the design of gas turbine engines have not only improved engine performance, but have also greatly reduced engine noise levels. Gas turbine noise sources that were once considered to be of minor importance have become major factors in designing an engine to reduce its noise emissions. Further reductions in gas turbine engine noise levels can still be achieved by substantially reducing the noise output of these noise sources. One such source of jet engine noise, commonly identified as "core noise," emits relatively low frequency noise resulting from the fuel combustion process and turbulent air flow passing over the jet engine combustor components. Once generated, this low frequency noise passes through the engine core, through the engine turbine structure, and out the engine tailpipe.

One proposed technique for suppressing core noise is reported by Kazin et al in American Society of Mechanical Engineers Paper No. 74-WA/Aero-2, entitled "Low Frequency Core Engine Noise." Kazin et al disclose that approximately 10 decibels of noise suppression can be obtained by a cavity resonator located directly behind or downstream from the engine combustor assembly. Although suppression of core noise by 10 decibels is a substantial improvement, application of this technique would generally require major changes in the design of gas turbine engines, since the region downstream of the combustor structure in a conventional gas turbine engine is almost entirely occupied by the engine turbine structure. Further, such an approach relies solely on attenuation of an established noise source rather than modifying the characteristics of the noise-producing process to control the generated noise level.

Noise source modification to control the acoustic wave fronts generated by a combustion process is known in the art and has been applied to eliminate or reduce combustion irregularities and/or undue heating and vibration of gas turbine engine combustor structure. For example, U.S. Pat. No. 2,807,931, issued to Albert G. Bodine, Jr. discloses acoustic attenuators placed directly into the outer combustor wall of a jet engine. These acoustic attenuators are located at points of high acoustic impedance to eliminate or reduce acoustic resonance of the combustor to thereby improve the combustion process by eliminating combustion irregularities or instabilities. Although Bodine seems to recognize that there is a complex functional relationship between the acoustic properties of a gas turbine engine combustor structure and the combustion process, the Bodine disclosure does not address the conceptually related but quite different problem of constructing and arranging an engine combustor to reduce noise levels.

Accordingly it is an object of the this invention to provide a noise suppressing combustor assembly for use in conventionally configured gas turbine engines. It is a further object to this invention to provide a combined gas turbine engine combustor and noise suppressor arrangement that is configured to reduce combustion noise by both the modification of the combustion process and by the attenuation of the noise produced by the modified combustion process.

SUMMARY OF THE INVENTION

These and other objects are achieved in accordance with this invention by a combustor and noise suppressing assembly including a combustor of annular, cannular or can-annular configuration. The inner combustor wall, which defines the burner cavity, e.g. a burner can or an annular burner, is configured to permit combustion noise to pass into the airflow duct or cavity formed between the inner and outer combustion walls. The outer combustor wall includes a plurality of holes or openings to couple the noise generated within the burner into resonance-type or absorption-type sound suppressors that are mounted around the outside surface of the outer combustor wall in the region between the outer combustor wall and the engine cowling. Since the region between the engine cowling and the outer combustor wall is largely unoccupied in a conventional gas turbine engine, this invention can be utilized within present engine designs.

Each embodiment of this invention modifies the combustion process occuring within the combustor to advantageously reduce noise level. More specifically the inner combustor wall is configured to permit outward transmission of combustion noise to thereby modify the combustion process so that, unlike prior art combustors, the combustion process does not correspond to the classical situation of an acoustic signal source contained within a hard walled cavity or tube, but corresponds more closely to the classical situation of an acoustic signal source located in free space or homogeneous transmission media. Thus at least a portion of the acoustic reflections and resonances that are responsible for the noise emitted from a conventional combustor structure are eliminated. Advantageously the combustion modification that occurs in the practice of this invention does not adversely affect engine performance, but often improves performance by effecting a smoother combustion process.

In accordance with one embodiment of this invention, the inner combustor wall includes a plurality of small diameter acoustic transmission holes or openings that permit passage of combustion noise into the airflow duct region between the inner and outer combustor walls. These openings differ from the conventional inner combustor wall openings, e.g. combustion air openings, cooling air openings, and dilution air openings, in that the acoustic openings are dimensioned to exhibit a low coefficient of discharge. This dimensioning greatly reduces the airflow into the burner cavity from the air duct region that would otherwise prevent the passage of combustion noise. The effective diameter of these acoustic openings is generally less than 1/32 of an inch which is on the order of 4 times smaller than the diameter of the smallest conventional inlet openings. These acoustic openings are distributed over the surface of the inner combustor wall to occupy from 10 to 30 percent of the surface area of the inner combustor wall.

In other embodiments of this invention, the inner combustor wall includes acoustic openings comparable in size to conventional inlet openings with acoustic opening including a flow barrier to substantially block the passage of air into the burner cavity. The flow barriers are formed in these embodiments by a variety of techniques such as dimpling at least a portion of the periphery of the acoustic opening so that the dimpled portion of the acoustic opening that is exposed to the air flow extends outwardly into the combustor airflow duct. Alternatively, flow barriers formed in these embodiments by slotting a portion of the inner combustor wall and forming the downstream edge of the slotted region such that it extends outwardly into the air duct region.

In yet another embodiment of this invention, a burner cavity that is considerably shorter than prior art burner cavities is utilized with the length of the shorter burner cavity corresponding to the length of the primary combustion zone. Mixing of the hot combustion products and the relatively cold compressed air that normally takes place in the secondary combustion and dilution zones of a conventional combustor is effected by relatively large flutes or corrugations formed in the inner combustor wall with the corrugations extending substantially parallel to the direction of air flow through the combustor airflow duct. Mixing and dilution are further enhanced by scoops or protrusions that are located along the interior surface of the outer combustor wall aft of the burner cavity. These protrusions extend into the airflow duct to establish turbulent mixing regions. In this embodiment, the portion of the outer combustor wall directly downstream from the shortened burner cavity structure is perforated to permit passage of the combustion noise into resonant cavity-type or bulk absorber-type noise suppressors that are mounted in the available regions on the outside surface of the outer combustor wall.

BRIEF DESCRIPTION OF THE DRAWINGS

FIG. 4 is a perspective view depicting a portion of an inner combustor wall that includes acoustic openings for coupling combustion noise to the airflow channel formed between the inner and outer combustor walls in accordance with the invention; and FIG. 5 is a cutaway perspective view of another embodiment of this invention including a relatively short burner cavity with structural provision for flow mixing and dilution of the combustion gases and a noise suppressor surrounding the airflow duct aft of the burner cavity outlet orifice.

DETAILED DESCRIPTION

Figure 1:
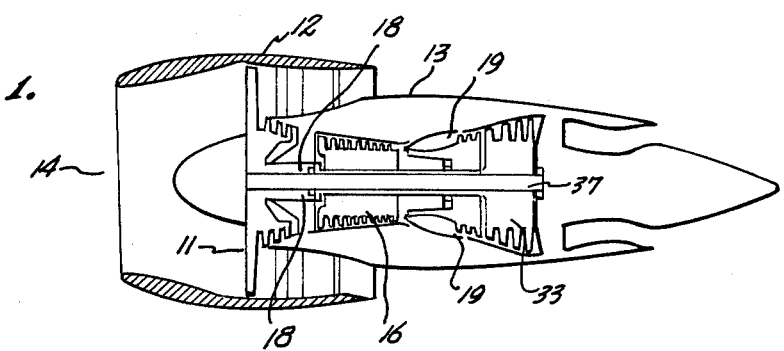
FIG. 1 is a longitudinal sectional view of a conventional jet propulsion engine that can advantageously employ the present invention.
Figure 2:
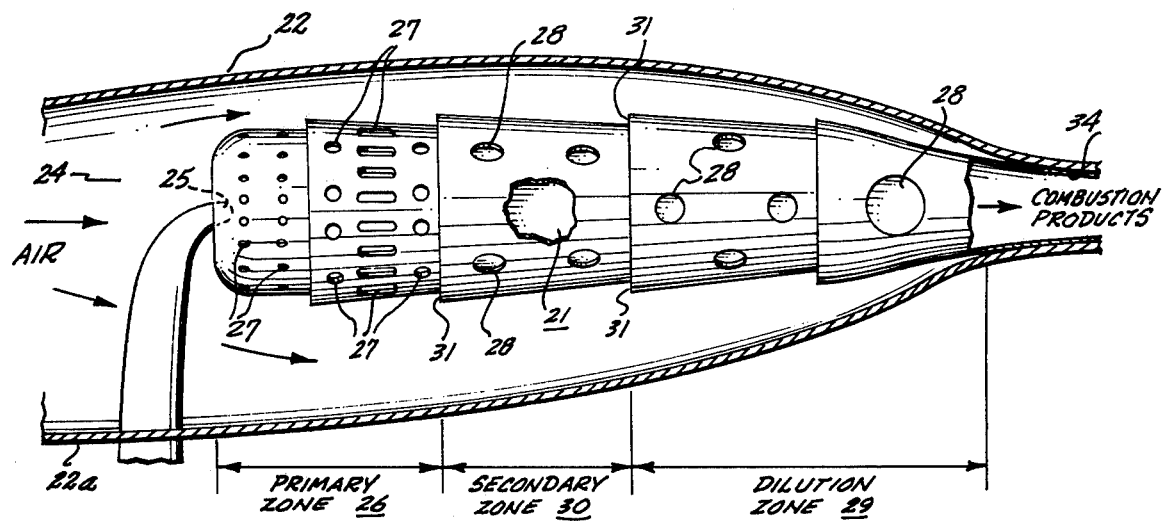
FIG. 2 is a side elevation view of a conventional can-annular combustor, such as the combustor of the jet engine of FIG. 1.

FIGS. 1 and 2 respectively depict a typical turbofan jet propulsion engine and a combustor therefor that can advantageously employ the present invention. Upon reading the following description of this invention, it will be understood by those skilled in the art that, although the engine depicted in FIG. 1 is of the aircraft turbofan variety, the present invention can be utilized in other types of gas turbine engines. Such gas turbines include aircraft auxiliary power units, marine propulsion engines and stationary gas turbines, e.g. gas turbines that drive electrical generators. Further it will be understood that this invention can be practiced in furnaces and similar apparatus that utilize the types of combustors herein described.

The turbofan engine of FIG. 1 includes a fan assembly 11 mounted forwardly of the fan duct within the forward portion of engine cowling 13. Inlet air flowing through the engine inlet orifice 14 passes through fan assembly 11. A portion of the air is ducted to axial compressor 16 through air duct 18 while the remainder is exhausted through the fan duct 12. The compressed air flowing from compressor 16 is introduced into combustor section 19. As shall be described in more detail hereinafter, combustor 19 includes a burner cavity mounted within a surrounding airflow duct that receives the compressed air from compressor 16. Fuel is injected into the burner cavity and ignited. Air, flowing from the airflow duct into the burner cavity through air inlet openings in the wall of the burner cavity, is mixed with the combusted fuel to form combustion products that generate the engine thrust. These combustion products flow through turbine 33 causing the turbine rotors to rotate. Since the turbine rotors are connected to shaft 37, and shaft 37 is also connected to the rotors of axial compressor 16 and to the fan blades of fan assembly 11, the turbine rotors, the compressor rotors, and the fan blades rotate as a unit.

It can be noted in FIG. 1 that there is virtually no space available aft of combustor 19 between engine cowling 13 and turbine 33 for mounting a noise suppressor in the manner suggested in the previously-referenced Kazin et al. technical article. Thus prior art suppression techniques are not applicable without redesigning the engine to facilitate the mounting of suppressors on a structure such as an airflow duct between combustor section 19 and turbofan 33.

FIG. 2 depicts one type of conventional combustor, normally identified as a can-annular combustor, that can be utilized as combustor 19 of FIG. 1. The combustor of FIG. 2 includes a generally can-like or cylindrically shaped burner cavity 21 formed by inner combustor wall 23. Burner cavity 21 is enclosed by outer combustor wall 22 with outer combustor wall 22 forming an annulus around the axial centerline of the engine. In a can-annular combustor a radially inwardly spaced wall forms a second coaxial annulus 22a that cooperates with the outer combustor wall to form an annular airflow duct 24 in which the burner cavity 21 is positioned. Generally, a plurality of burner cavities, such as burner cavity 21, are mounted at predetermined positions around the annular airflow duct 24 formed by outer combustor wall 22.

As is known in the art, outer combustor wall 22 and inner combustor wall 23 can be arranged in other conventional manners to form combustor configurations other than the can-annular configuration of FIG. 2. In one type of combustor, often utilized within smaller gas turbine engines, the inner combustor wall forms a can-like structure often called a burner-can that defines a cylindrically shaped burner cavity. In this cannular or can-type combustor, the outer combustor wall forms a second cylindrically shaped cavity coaxial with and surrounding the burner-can. In another combustor arrangement, known as an annular combustor, the outer combustor wall forms an annular airflow duct while the inner combustor wall forms an annular burner cavity.

The annular burner cavity is positioned in a coaxial relationship inside the annular airflow duct formed by the outer wall.

Regardless of the exact combustor configuration, fuel is injected into the forward end of burner cavity 21 by fuel nozzle 25 (FIG. 2) and high pressure air flowing from compressor 16 (FIG. 1) through combustor airflow duct 24 is forced into burner cavity 21 through openings such as holes or slots in inner combustor wall 23. Each opening in inner combustor wall 23 is configured to allow air flow from combustor air duct 24 into burner cavity 21. Such openings include combustion openings 27, located in primary combustion zone 26 adjacent the forward end of the burner cavity 21. Primary combustion zone 26 is that portion of burner cavity 21 that contains the actual combustion of the fuel/air mixture (flame). Combustion openings 27 include primary and secondary combustion openings with the larger slotted and circular openings of FIG. 2 illustrating typical combustion openings. It will be understood by those skilled in the art that both the length of primary combustor zone 26 and the configuration and arrangement of combustion openings 27 are normally determined by experimental means after a preliminary combustor design is effected. Thus various configurations may be encountered in different conventional jet engines with combustor openings 27 generally being on the order of ¼ inch to 1 inch in diameter or width.

The second region of burner cavity 21, usually denoted as the secondary combustion zone, is identified by numeral 30 in FIG. 2 and is located in the central portion of the burner cavity 21. Dilution openings 28 in inner wall 23 of burner cavity 21 are spaced throughout the portion of the inner wall adjacent the secondary combustion zone 30 to allow airflow into the interior of burner cavity 21. The lower temperature air flowing through dilution openings 28 from the airflow duct mixes with the high temperature combustion products to increase combustion efficiency.

A third region of burner cavity 21, usually denoted as the dilution zone is identified by numeral 29 in FIG. 2 and is located adjacent the rearward end of burner cavity 21. Dilution zone 29 includes additional dilution openings 28 to effect further mixing of the combustion products with the lower temperature air supplied by compressor 16.

Inner combustor wall 23 normally includes a third type of air inlet opening to establish a film of cool air along the interior face of inner wall 23 to prevent overheating of the burner can. In the combustor arrangement of FIG. 2, cooling inlets 31 are configured as small annular slots located about the circumference of burner cavity 21 at various positions along the length of burner cavity 21. In other conventional combustor configurations, cooling is effected by a large number of openings, generally between ⅛ and ¼ inch in diameter, distributed throughout the entire inner combustor wall 23.

Figure 3:
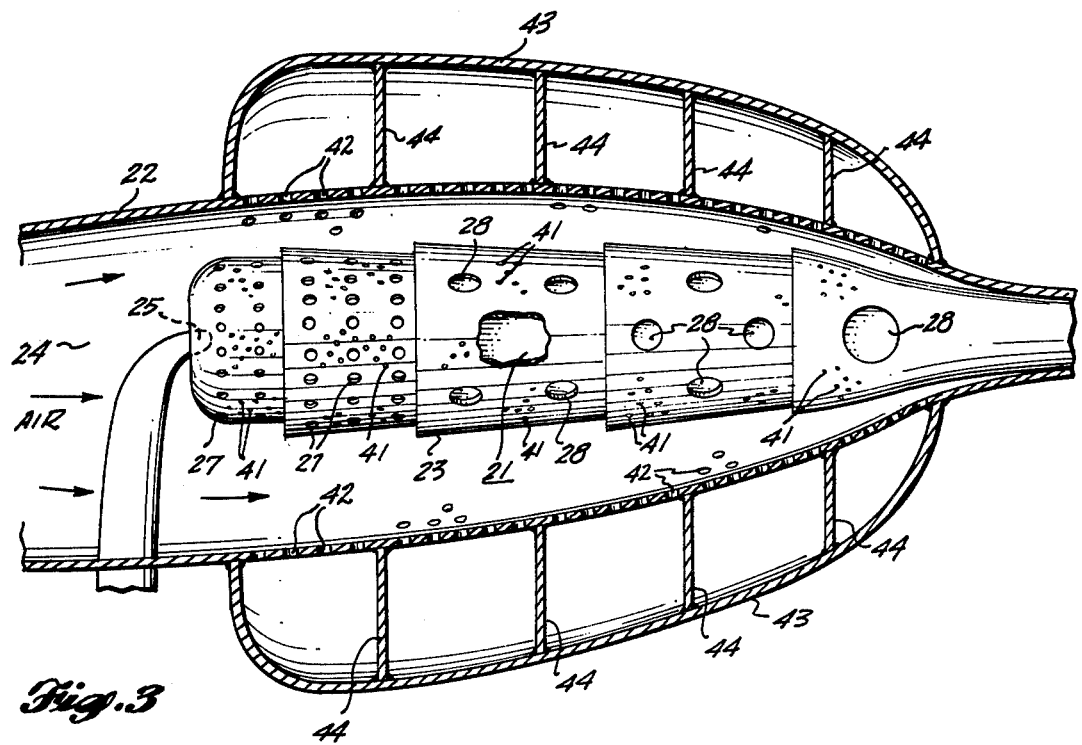
FIG. 3 is a side elevation view of a portion of a can-annular burner cavity and a noise suppressor with acoustic openings in the inner combustor walls for coupling combustion noise from the burner cavity to the surrounding airflow duct in accordance with one embodiment of the invention.

Referring to FIG. 3 one embodiment of the combined combustor and noise suppressor in accordance with this invention includes means for coupling the combustion noise through inner combustor wall 23 and outer combustor wall 22 into a noise suppressor mounted in the open cavity formed between combustor 19 and engine cowling 13 of FIG. 1. Although the basic configuration of the combustor is the same as the combustor assembly depicted in FIG. 2, combustor wall 23 of the embodiment of FIG. 3 includes a plurality of small diameter holes or openings 41 that acoustically couple the combustion noise into the combustor air duct 24. Further, the embodiment of FIG. 3 includes a plurality of openings 42 in outer combustor wall 22 that couple the combustion noise from air duct 24 into a noise suppressor 43 that is mounted on the exterior surface of outer combustor wall 22. Acoustic openings 41 in inner combustor wall 23 differ both in configuration and in function from the inlet holes of a conventional combustor, e.g. combustion openings 27, dilution openings 28 and cooling inlets 31 of FIGS. 2 and 3. Specifically openings 41 are much smaller in diameter than any of the conventional airflow openings to achieve a low coefficient of discharge. For example, in a conventional combustor configuration, normal air inlet openings, are generally ⅛ inch or larger, while the acoustic openings 41 of this invention are generally 1/32 inch or less in diameter. Since openings 41 have a low coefficient of discharge, there is no appreciable air flow into the interior of burner cavity 21 from air duct 24 through openings 41. As shall be explained in more detail hereinafter, preventing air flow through acoustic openings 41 allows the combustion noise generated in the interior of burner cavity 21 to pass into combustor airflow duct 24. In the practice of this invention, we have found that acoustic openings 41 satisfactorily couple combustion noise into combustor duct 24 when acoustic openings 41 are substantially uniformly distributed over the surface of inner duct wall 23 and occupy approximately 10 to 30 percent of the surface area of inner wall 23.

As previously stated, outer combustor wall 22 is perforated by a plurality of openings 42 that acoustically couple the combustion noise from air duct 24 into the interior region of suppressor 43. The arrangement and size of openings 42 is determined in a manner known in the art so that acoustic energy within the frequency range of approximately 100 to 1000 hz can pass through outer combustor wall 22. Noise suppressor 43 of FIG. 3 is mounted over the outer surface of outer combustor wall 22 and is of the type known as a resonant cavity suppressor. Generally such a resonant cavity noise suppressor is designed to resonate at a predetermined frequency to thereby suppress acoustic energy over a finite frequency band. Resonant cavity suppressor units normally include internal partitions such as longitudinal partitions or spacers 44 of FIG. 3, dividing the suppressor into a number of smaller cavities, to prevent wave propagation within the interior region of the noise suppressor. A variety of partitioning techniques are known to those skilled in the art and often a cavity type suppressor such as noise suppressor 43, will also include radial baffles spaced at predetermined angles around the circumference of the suppressor unit (not shown in FIG. 3) to further partition the noise suppressor. Regardless of the structural detail of noise suppressor 43, combustion noise is coupled to the interior regions of the suppressor by openings 42 and dissipated therein.

A combustor-suppressor arrangement configured in accordance with the embodiment of this invention depicted in FIG. 3 effectively forms noise suppression structure that is commonly called a two-layer acoustic lining with inner combustor wall 23 forming the first layer and outer combustor wall 22 forming the second layer. A two layer acoustic lining inherently provides two degrees of freedom (i.e. the acoustic characteristics of the cavity formed between the first and second layer and the acoustic characteristics of the cavities behind the second layer, separately contribute to the overall acoustic characteristics). Accordingly, in the practice of this invention, characteristics such as the frequency range over which maximum noise suppression occurs can be controlled by state-of-the-art design techniques. It will be realized by those skilled in the art that achieving noise suppression over a relatively broad frequency range is important in the practice of this invention, since, for example, temperature variations within the combustor will cause changes in the speed of sound that will, in turn, cause changes in the frequency spectrum of the combustion noise. In the practice of this invention, we have determined that noise suppression is achieved over a frequency range of 100 to 1000 Hz to adequately suppress combustion noise throughout normal engine operating conditions.

A cursory examination of our invention, such as the embodiment depicted in FIG. 3, might lead one to believe that the functional aspects of our invention do not extend beyond those of a classical resistive/acoustic liner, such as the above-mentioned two-layer acoustic lining. Although it is true that suppressor 43 does function as a classical suppressor to absorb a portion of the combustion noise generated within the burner cavity 21, the presence of acoustic openings 41 in the inner combustor wall and the spatial relationship between noise suppressor 43 and the combustor assembly modifies the acoustic output of the combustion process over that occuring within a conventional combustor to decrease the noise level. This aspect of our invention can best be understood by first realizing that a conventional combustor arrangement, not configured in accordance with our invention, substantially corresponds to the classical theoretical acoustics situation of an acoustic source enclosed in a hard-wall tube or duct, i.e., a tube having walls that totally reflect incident acoustic energy. A conventional combustor presents this configuration even though inner combustor wall 23, which forms burner cavity 21, includes air inlet openings such as combustion openings 27, dilution openings 28 and cooling inlets 31, since the relatively high velocity, turbulent air flowing through these inlet openings effectively closes the openings and prevents outward transmission of noise generated within burner cavity 21. As is known in the art, when a noise source is enclosed in a hardwall duct of diameter less than or comparable to the wavelength of the generated noise, the radiation impedence of the sound source is modified over the radiation impedance that would be exhibited if the noise source were located in free spaced. Modification of the radiation impedance leads to amplification of the noise at certain frequencies that are determined by the duct geometry. Since the wavelength of combustion noise is on the order of 5 feet, there is a great deal of source-wall interaction in the combustion process of a conventional combustor and amplification of the noise at certain frequencies generally occurs. In the practice of this invention however acoustic openings 41 in inner combustor wall 23 and acoustic openings 42 in outer combustor wall 22 permit the outward transmission of noise through the duct walls. Since both outer combustor wall 22 and inner combustor wall 23 are open to the transmission of sound, the combustion process corresponds more closely to the classical situation of an acoustic source located in free space, thus eliminating the generation of the amplified noise. Accordingly it can be realized that in the practice of our invention lower noise is achieved by at least partially eliminating the generation of certain noise components that occur in conventional combustor units and by the dissipation of a substantial portion of the noise energy generated by this modified combustion process. It should be realized however, that noise suppression in accordance with our invention does not alter the steady state combustion process itself, that is, the combustion efficiency, temperature profile, and other parameters important to efficient engine operation are not detrimentally effected. In fact, it has been determined that the practice of our invention has a beneficial effect on the combustion process in that the combustion process becomes less irregular or sporadiac effecting "smoother" combustion.

Conventional noise suppressors, other than the resonant cavity-type noise suppressor 43 of FIG. 3, are suitable for the use in the practice of this invention and are known to those skilled in the art, e.g. bulk absorber-type suppressors. Generally bulk absorber suppressors include a layer or volume of acoustically absorbent material mounted over the exterior walls of a duct such as airflow duct 24 formed between inner combustor wall 23 and outer wall 22. In such a noise suppressor, acoustic energy is coupled to the acoustically absorbent material through a porous duct lining or a plurality of holes such as openings 42 of FIG. 3 and the acoustic energy is dissipated within the lining material.

Although a variety of suppressor configurations can be employed in the practice of this invention, it has been determined that resonant cavity-type suppressors may be preferable over bulk absorber-type suppressors. In one realization of a cannular or can-type combustor embodiment of this invention, an outer combustor wall 22 formed an eight inch inner diameter airflow duct containing a coaxially mounted cannular burner cavity. A resonant cavity-type suppressor comprising an eight inch long and four inch deep annular chamber surrounded the duct wall adjacent the combustor. An annular radially extending spacer, such as spacer 44 of FIG. 3, partitioned the suppressor into two 4-inch annular cavities and radially extending partitions mounted at 45° intervals about the annular chamber that extended between the duct wall and the outer shell of the suppressor. This combined combustor and suppressor provided several decibels more noise suppression than a similarly dimensioned bulk absorber-type suppressor unit in which the cavities were filled with fiberglass having a density of 11.3 pounds per cubic foot. It was also found that, at least with respect to the cannular combustor and suppressor just described, the 8" long by 4" deep suppressor was substantially as efficient as noise suppressors having as much as a 12" depth. This finding is somewhat contrary to classical acoustic theory in the one would ordinarily except that a large suppressor volume is necessary to satisfactorily suppress low frequency noise such as combustion noise. It should be realized however, that certain bulk absorber-type suppressors that are superior to the previously mentioned fiberglass filled suppressor may be available. In addition, for particular applications, structural constraints or space limitations may exist that will dictate the use of a bulk absorber-type suppressor unit.

In practicing this invention within variously configured conventional gas turbine engines, the dimensions and configuration of the noise suppressor will generally be determined by the engine configuration. For example, in an application such as the previously referred to situation in which the invention is incorporated in an engine having a cannular combustor arrangement, it is often possible to construct a noise suppressor, such as suppressor 43 of FIG. 3, as an annularly shaped suppressor that completely surrounds outer combustor wall 22. On the other hand, in an engine arrangement utilizing a can-annular or annular combustor arrangement, sufficient space may not be available to mount an annular noise suppressor along the entire surface of outer duct wall 22. That is, in the depicted engine arrangement of FIG. 1, adequate space is available for mounting an annular suppressor between the outer combustor wall 22 and engine cowl 13 adjacent the location of the burner can, but a much smaller space is available for mounting such the annular shaped suppressor between the outer combustor wall and the engine structure surrounding shaft 37 and turbine assembly 33 at a location rearwardly from the burner can. In such a situation, the suppressor 43 should be configured to utilize the available space. For example, a plurality of separate noise suppressors that are mounted along outer combustor wall 22.

Referring to FIG. 4, a portion of inner combustor wall 23 which includes acoustic openings that can be used in place of, or in addition to, acoustic openings 41 of FIG. 3. Conventional air inlet openings are typified in FIG. 4 by openings 51 which may correspond to the previously mentioned combustor openings, dilution openings or cooling inlets. A first type of acoustic opening 53, configured to pass combustion noise from the interior of burner cavity 21 to airflow duct 24 surrounding the burner cavity, is a circular opening through inner combustor wall 23. A flow barrier 54 is positioned adjacent the upstream edge of each of the acoustic openings 53. Each flow barrier 54 is a smooth protrusion having a width substantially identical to the width of acoustic opening 53 with the protrusion extending outwardly from inner combustion wall 23 into air duct 24. Although acoustic openings 53 may be of other than circular geometry and flow barriers 54 may be formed seperately from, or in a single operation with, the formation of acoustic opening 53, the flow barriers 54 are configured to deflect the airflow away from opening 53 to prevent the passage of air through opening 53 into the burner cavity. Since the inflow of air through opening 53 is greatly reduced or eliminated by the flow barriers, opening 53 permits the passage of the combustion noise energy generated within the burner cavity into the combustor airflow duct.

A second type of acoustic opening 56 that may be employed in the practice of this invention is similar to acoustic openings 53 in that each acoustic opening 56 includes a flow barrier 57. In the case of acoustic opening 56, the opening and the flow barrier 57 are formed by a tab-like narrow longitudinal section that has its downstream and end sides cut from the inner combustor wall 23 where the upstream end of the tab-like section remains joined to the remainder of the burner wall. The downstream end of the tab-like section is bent outwardly so as to protrude into the combustor air flow duct 24. It will be realized by those skilled in the art that various other methods may be employed to construct an acoustic opening similar to openings 53 and 56 just described, to prevent air inflow by means of a flow barrier. For example, inner combustor wall 23 may include variously configured acoustic openings and flow barriers or air deflectors may be attached or welded to inner combustor wall 23 adjacent to the acoustic opening and directly upstream thereof to deflect the airflow away from the acoustic opening. In any case, acoustic openings such as acoustic opening 53 and 56 of FIG. 4 are shaped to minimize inflow into the burner cavity. In addition it has been found that when 10 to 30 percent of the area of the inner combustor wall 23 contains acoustic openings of this type, the combustion noise is satisfactorily coupled from the burner cavity to the combustor airflow duct. The openings can be circular and have a diameter of approximately $\frac{1}{4}''$ to 1", or can be openings of other geometry having a corresponding open area.

FIG. 5 depicts a combined can-type combustor and noise suppressor in accordance with this invention that includes a burner can 61 and a mixer section 62 coaxially mounted within a cannular flow duct formed by outer combustor wall 22. The mixer section 62 is connected to and extends aft of the burner can 61. In this embodiment, the burner cavity formed by burner can 61 is much shorter than prior art burner cavities to permit suppression of the combustion noise downstream from the burner cavity by an annular noise suppressor 71 that is mounted over the exterior of outer combustor wall 22 in the region between the rearmost end of mixer 62 and the outlet to the turbine unit. In the embodiment of FIG. 5, burner can 61 includes the plurality of conventionally configured combustion openings 27 and is of a length that generally corresponds to the length of the primary combustion zone, e.g. primary combustion zone 26 of the conventional combustor depicted in FIG. 2. As previously described, combustor openings 27 generally range between $\frac{1}{4}''$ and 1" in diameter, with the opening size, the number of openings and the arrangement of the openings, along with the length of the primary combustion zone 26, determined partially by known theoretical design techniques and partially by experimentation.

Mixer section 62 of the combustor/suppressor embodiment of FIG. 5 performs the mixing and dilution of the combustion products with the inflowing air that is normally effected within the secondary combustion zone and the dilution zone of a conventional combustor. As can be seen in FIG. 5, mixer section 62 is shaped somewhat like a truncated conical shell with the cross-section at the line of truncation slightly larger than, or substantially the same as, the cross-sectional geometry of the exit orifice of burner can 61 so that mixer 62 can be joined to burner can 61 to effectively form a single tubular structure. Exit orifice 63 of mixer section 62 is dimensioned such that the mixer section wall, along exit orifice 63, is in close proximity to the inside surface of outer combustor wall 22. In addition, the wall of mixer section 62 is formed to establish a series of tapered corrugations or flutes 64 with the longitudinal dimension of each corrugation substantially parallel to the axial centerline of mixer section 63. Effectively, corrugations 64 of mixer section 63 form a series of cleft-like valleys or airflow channels 66 which control the flow of dilution air into the combustion products flowing rearwardly aft of exit orifice 63. Like the configuration of the dilution holes in a prior art combustor, the height-to-width ratio and the number of corrugations necessary to effect the most advantageous dilution is best determined by experimental means. In an embodiment in which the cross-sectional area of the forward end of mixer 62 is greater than the cross sectional area of the exit opening of burner can 21, the forward end of mixer 62 generally forms an annular ring or flange to adapt mixer 62 for connection to burner can 61. This flange can include small openings or slots around the periphery thereof to admit dilution air or cooling air directly into the interior region of mixer 62.

To enhance mixing of the combustion products with the air flowing through airflow channels 66, a plurality of protruding air scoops 69 are positioned along the interior surface of that portion of outer combustor wall 22 that is aft of mixer exit orifice 63. These air scoops may be separate components mounted on outer combustor wall 22 or may be formed in the combustor wall itself. In any case, air scoops 69 are generally wedge-shaped obstacles that cause small turbulent air flow regions to mix the combustion products with the dilution air. In the combustor/suppressor arrangement of FIG. 5, noise suppressor 71, which is mounted around the exterior surface of outer combustor wall 22 in the region between mixer exit orifice 63 and the outlet to the turbine unit is configured in the same manner as suppressor 43 of FIG. 3 and is acoustically coupled to the air duct cavity by openings 42 in the outer combustor wall to attenuate the combustion noise generated within burner can 61.

If desired or necessary, burner can 61 and mixer section 62 of the embodiment of FIG. 5 can include acoustic openings similar to acoustic openings 41 of the embodiment of FIG. 3 or acoustic openings 53 or 56 of the embodiment of FIG. 4 to permit passage of combustion noise into the air duct region surrounding burner can 61 and mixer 62. In such an embodiment, noise suppressor 71 must extend over that portion of outer combustor wall 23 that is adjacent to burner can 61 and mixer section 62, and outer wall 22 must include openings 42 for coupling the combustion noise into this portion of suppressor 71. Further, in such an embodiment, either a separate suppressor can be mounted over the burner can-mixer region or a single suppressor can be partitioned and dimensioned to acoustically tune the portion of the suppressor that is in acoustical communication with the burner can-mixer in a different manner than that portion of the suppressor that is in acoustic communication with the air duct region downstream of mixer exit orifice 63.

What is claimed is:

1. A combined combustor and combustion noise suppressor for a gas turbine engine including a compressor and a turbine, comprising:
   an outer combustor wall defining an airflow duct between said compressor and said turbine, said outer wall having an inner surface;
   an inner combustor wall defining a burner cavity, said inner wall being mounted in said airflow duct in spaced relationship from the inner surface of said outer wall, said inner combustor wall including a plurality of air inlet openings therein for placing said burner cavity in fluid communication with said duct, said air inlet openings being dimensioned to allow air flowing through said airflow duct to flow into said burner cavity, said inner combustor wall further including a plurality of acoustic openings for acoustically coupling said burner cavity and said airflow duct, said acoustic openings being dimensioned and arranged to have a low coefficient of discharge relative to the coefficient of discharge of said air inlet openings for minimizing airflow through said acoustic openings and being dimensioned and arranged to allow combustion noise generated within said burner cavity to pass through said acoustic openings and into said airflow duct; and
   noise suppressing means mounted on said outer combustor wall exterior to said airflow duct for receiving and attenuating noise, said noise suppressing means being located adjacent at least a portion of the acoustic openings in said inner burner wall, said outer combustor wall having a plurality of acoustic openings for acoustically coupling said airflow duct and said noise suppressing means to allow said combustion noise to be transmitted from said burner cavity through said airflow duct and into said noise suppressing means.

2. The combined combustor and combustion noise suppressor of claim 1 wherein the total open area of the acoustic openings in said inner wall is 10 to 30 percent of the surface area of said inner wall.

3. The combined combustor and combustion noise suppressor of claim 2 wherein said acoustic openings are substantially circular and have a diameter no greater than about 1/32 inch.

4. The combined combustor and combustion noise suppressor of claim 1 further comprising airflow barriers associated with at least some of said acoustic openings, each of said airflow barriers being located adjacent an associated one of said acoustic openings and extending outwardly into said airflow duct from a portion of the outer surface of said inner wall that is upstream of said associated acoustic opening relative to the direction of flow through said airflow duct, each of said airflow barriers being so constructed and oriented relative to its associated acoustic opening as to inhibit airflow through said associated acoustic opening and minimize airflow from said airflow duct through said associated acoustic opening and into said burner cavity.

5. In a jet engine combustor assembly including an inner combustor wall defining a burner cavity and having an exterior surface and an outer combustor wall surrounding and spaced from said inner combustor wall to form an airflow duct between said inner combustor wall and said outer combustor wall, said inner combustor wall including a plurality of airflow openings dimensioned to conduct air from said airflow duct into said burner cavity, wherein fuel is ignited within said burner cavity and wherein the airflow through said airflow openings travels with a velocity that prevents substantial outward propagation of the combustion noise generated by ignition of said fuel, the improvement comprising:
   acoustic openings in said inner combustor wall for acoustically coupling the combustion noise generated within said burner cavity to those regions of said airflow duct surrounding said burner cavity, said acoustic openings being dimensioned and arranged to minimize airflow from said airflow duct into said burner cavity relative to that airflow conducted through said airflow openings; and
   noise suppression means mounted on the exterior surface of said outer combustor wall for attenuating said combustion noise coupled to said regions of said airflow duct, said outer combustor wall including a plurality of openings for coupling said combustion noise from said airflow duct to said noise suppressing means.

6. The improvement of claim 5 wherein said acoustic openings include a plurality of small openings relative to said airflow openings, said acoustic openings having a low coefficient of discharge to permit the passage of acoustic noise energy while simultaneously minimizing the flow of air from said airflow duct into said burner cavity.

7. The improvement of claim 6 wherein said acoustic openings are substantially circular and have a diameter no greater than 1/32 of an inch.

8. The improvement of claim 6 wherein the total open area of said acoustic openings is from 10 to 30% of the surface area of said inner combustor wall.

9. The improvement of claim 5 wherein said acoustic openings include a plurality of openings comparable in size to said airflow openings, each of said acoustic openings having an airflow barrier associated therewith, each of said airflow barriers being positioned adjacent to the upstream portion of its associated acoustic opening with each said airflow barrier extending outwardly from said inner combustor wall into said airflow duct and extending rearwardly over at least a portion of said associated acoustic opening to direct air flowing through said airflow duct away from said associated acoustic opening and minimize airflow through said acoustic openings from said airflow duct.

10. The improvement of claim 9 wherein the total area of said acoustic openings is 10 to 30% of the area formed of said inner combustor walls.

* * * * *